United States Patent [19]
McFadden et al.

[11] Patent Number: 5,224,415
[45] Date of Patent: Jul. 6, 1993

[54] FROZEN FOOD STORAGE AND DISPENSING SYSTEM

[75] Inventors: David H. McFadden, Lexington; Richard N. Caron, Dorchester; John M. Collins, Ipswich; Robert Farra, Leminster; Kevin P. Barnes, Stoneham; Joop F. Hoekstra, Medfield; Thomas P. Hosmer, Concord, all of Mass.

[73] Assignee: Gas Research Institute, Chicago, Ill.

[21] Appl. No.: 831,110

[22] Filed: Feb. 4, 1992

Related U.S. Application Data

[63] Continuation-in-part of Ser. No. 759,606, Sep. 13, 1991, Pat. No. 5,142,968, which is a continuation of Ser. No. 458,982, Dec. 29, 1989, abandoned.

[51] Int. Cl.5 .............. A47J 27/00; A47J 37/00; A47J 37/12; G07F 11/00
[52] U.S. Cl. ..................... 99/357; 99/407; 221/81; 221/150 R; 221/150 HC; 222/146.6
[58] Field of Search .............. 99/357, 407, 335, 334, 99/352, 355, 336, 404, 410, 411, 427, 330, 403; 221/81, 85, 150 R, 150 A, 150 HC, 116; 222/146.6; 62/258; 198/952; 414/418, 420, 421, 413, 404, 412

[56] References Cited

U.S. PATENT DOCUMENTS

| | | |
|---|---|---|
| 2,497,219 | 2/1950 | Haumann . |
| 2,719,651 | 10/1955 | Gabrielsen .................... 221/150 R |
| 2,804,982 | 9/1957 | Verrinder . |
| 3,075,670 | 1/1963 | Brugger ........................ 221/150 R |
| 3,190,489 | 6/1965 | Childers et al. ................ 221/81 |
| 3,227,501 | 1/1966 | Austin et al. .................. 221/81 |
| 3,237,804 | 3/1966 | Bardy et al. . |
| 3,315,785 | 4/1967 | Shiffer . |
| 3,398,672 | 8/1968 | Hoeberigs . |
| 3,685,432 | 8/1972 | Hoeberigs ..................... 99/357 |
| 3,779,410 | 12/1973 | Phillips et al. . |
| 3,838,790 | 10/1974 | Naruse ......................... 221/150 HC |
| 4,748,902 | 6/1988 | Maurantonio ................. 99/357 |
| 4,971,223 | 11/1990 | Falavigna ..................... 99/407 |
| 4,979,864 | 12/1990 | Cahlander et al. ............ 414/421 |
| 5,029,520 | 7/1991 | Okada .......................... 99/357 |
| 5,097,754 | 3/1992 | Covington et al. ............ 99/357 |
| 5,104,002 | 4/1992 | Cahlander et al. ............ 414/412 |
| 5,105,979 | 4/1992 | Bakx et al. .................... 221/150 HC |

FOREIGN PATENT DOCUMENTS 2593308  7/1987  France .................. 221/150 HC Primary Examiner—Timothy F. Simone
Attorney, Agent, or Firm—Schiller & Kusmer

[57] ABSTRACT

A system for and method of storing and automatically dispensing predetermined amounts of one or more food products from closed containers is described. The system preferably includes multi-compartment containers carried by a carrousel assembly and moved by a dispensing mechanism for automatically selecting the appropriate container and compartment for which food is dispensed. By using a control with memory for keeping inventory, the system can dispense any one of several food products on demand.

24 Claims, 11 Drawing Sheets

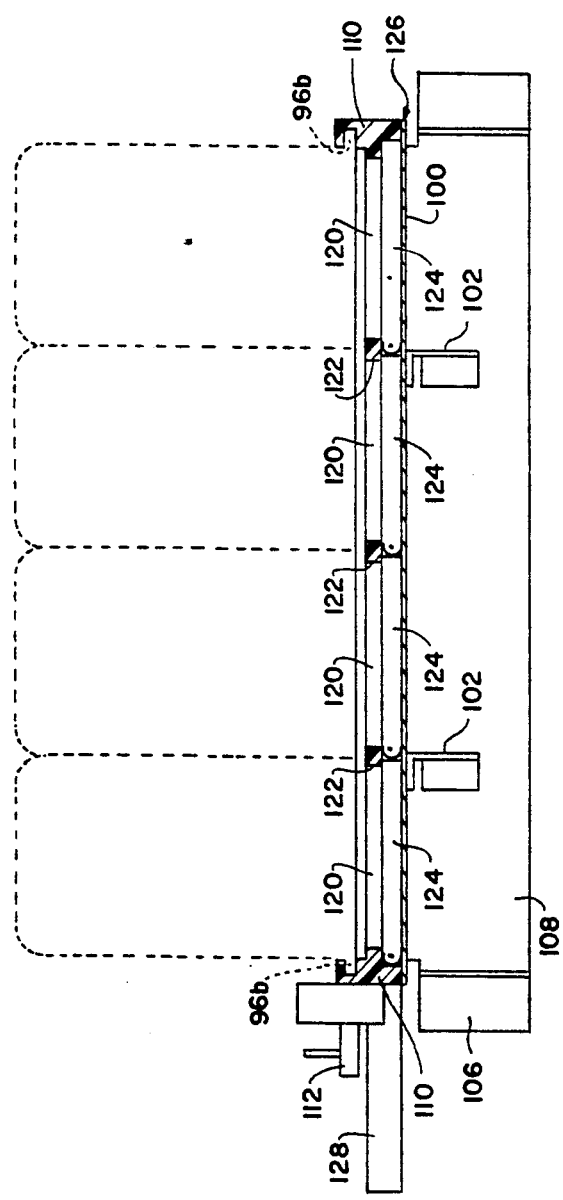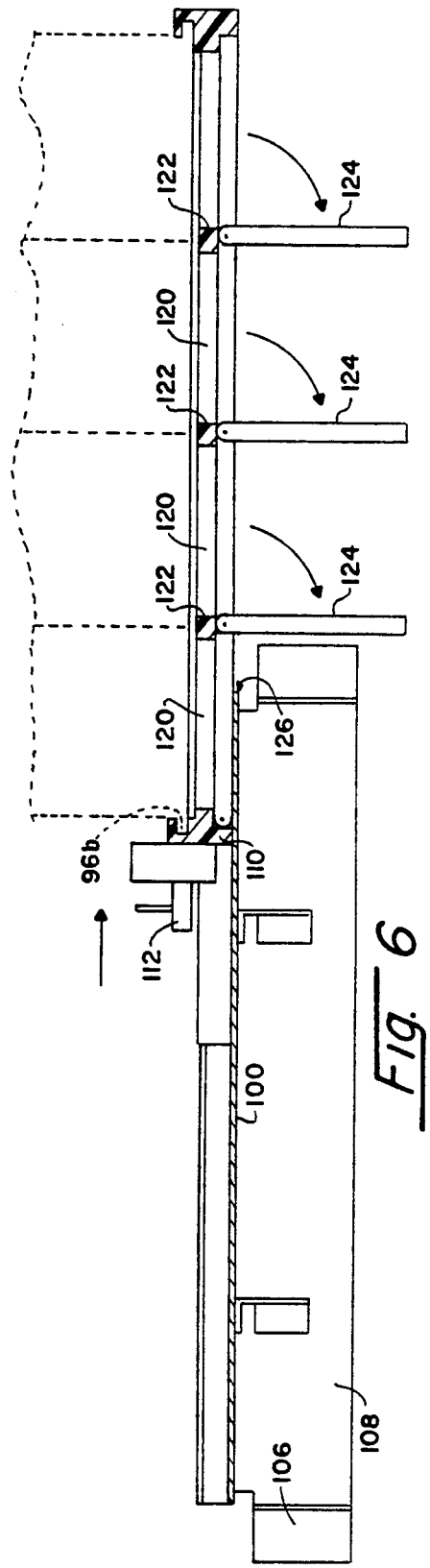

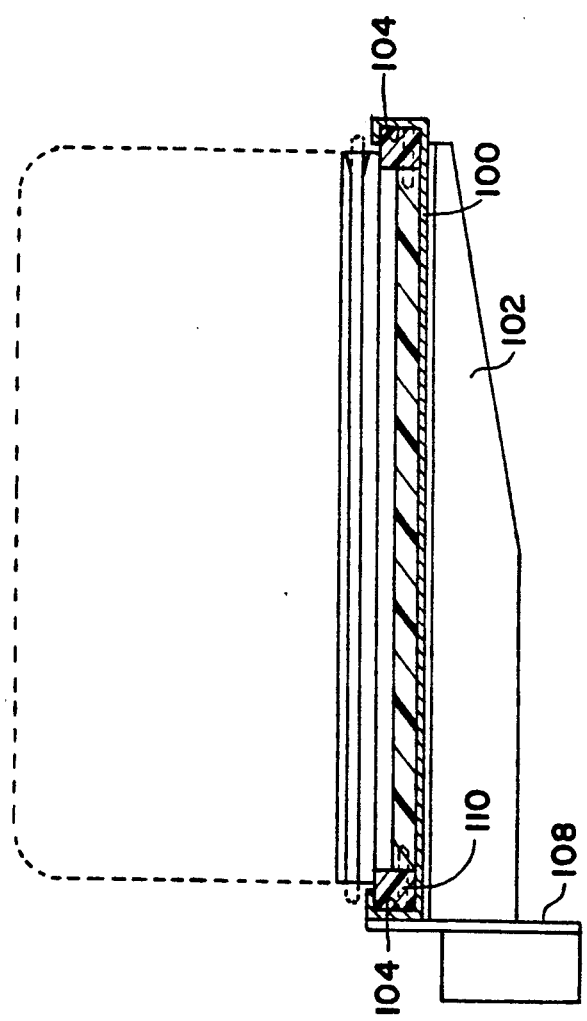

FROZEN FOOD STORAGE AND DISPENSING SYSTEM

RELATED APPLICATIONS

This application is a continuation-in-part of U.S. patent application Ser. No. 07/759,606, now U.S. Pat. No. 5,142,968, filed in the names of Richard N. Caron, David H. McFadden, John M. Collins, and John Dieckman, which application is a continuation of U.S. patent application Ser. No. 07/458,982, filed in the names of the same inventors and now abandoned.

BACKGROUND OF THE INVENTION

The present invention relates generally to frozen food storage and dispensing systems, and more particularly to an automated system for dispensing individual portions of one or a variety of frozen food products for use in conjunction with an automated deep fat fryer.

Generally, even though fryers are now available for cooking such food stuffs as french fries under computer controlled conditions, the operation used in most fast food chain restaurants uses manual labor to carry out a large part of the operation. In the typical operation, frying baskets are manually filled with pre-cut, partially cooked (parfried) strips of potatoes away from the fryer, and subsequently loaded onto a slack rack. When the operator wishes to cook the potatoes, a basket is manually removed from the slack rack and inserted into the basket lift arm of the fryer. The start button is pressed on the computer controlled fryer, and the basket lift arm lowers the basket into the preheated shortening. About thirty seconds into the cook, the operator usually manually raises the basket slightly and shakes it to break up strips of potatoes which may be stuck together. At the end of the cook cycle, the baskets are automatically raised by the lift arm out of the shortening. The baskets are then allowed to remain in a position above the fryer so that excess oil will drip back into the fryer. If done correctly, the basket is moderately shaken by the operator to remove as much oil as possible, and then manually removed from the lift arm. The french fried potatoes are then manually brought to a holding station, and emptied in the holding station In the holding station, the fries are manually salted and packaged using a fry scoop. The current practice is to hold the french fries unpackaged for up to 7 minutes and package them to order. Unsalted orders generally require cooking to order. A typical store using two adjacent fryers at a fry station will cook 100 lbs/day, which represents approximately 60-100 baskets of french fries.

Next to food costs, direct labor currently represents the largest operating cost component of this deep fat frying operation, currently accounting for approximately 21% of the total operating cost. Furthermore, fry station workers are becoming increasingly difficult to recruit since the segment of the work force willing to work in the hot, grease-laden environment of fast food restaurants is currently steadily declining, especially in the Northeast portion of the United States.

There is an increased interest therefore in automating deep fat frying operations by automating material handling and production control so as to (1) minimize the impact of crew member shortage, (2) reduce labor cost, occupational hazards and associated liabilities, and (3) improve the fried product consistency. Recent advances in computer-controlled operation of deep fat fryers have been limited in their utility, however, by the need for an automated frozen food storage and dispensing system capable of operating in conjunction with the frying apparatus. Such a system must be capable of maintaining the food product in a frozen state until almost immediately prior to cooking, of repeatably and reliably delivering a predetermined quantity of food product to a fry basket as needed, and of being quickly and easily accessed for periodic refilling and cleaning It is especially desirable that such a system be capable of accommodating and delivering on demand a variety of different frozen food products to different fry baskets.

In general, the prior art shows a variety of apparatuses for storing, conveying and dispensing food and non-food products in individualized containers or boxes. Several of these prior art patents show conveyors in various configurations and orientations. Several of the prior art patents also show the combination of a conveyor apparatus and a freezer or refrigeration compartment.

For example, U.S. Pat. No. 3,237,804 (Bardy et al.) teaches an automatic food storage and dispensing apparatus in which food portions are held in open pans or trays seated on hinged shelves on two spaced, parallel vertical conveyors positioned inside a temperature-controlled cabinet. At col. 2, lines 19-24, the Bardy et al. patent explains the intended use of the patented apparatus as follows: "One of the uses for which the presently disclosed apparatus has been specially developed is the refrigerated storage and dispensing of foods which are to be fried and placed on trays in a completely automated process. Examples of goods which are typically fried are: chicken, fish, shrimp, onion rings and potatoes." In the Bardy et al. patent, food is dispensed by sliding a food-carrying tray down an incline to a horizontal conveyor that, in turn, carries the tray to a "tray dumping mechanism," (col. 2, lines 61-62).

The complex Bardy et al. system, however, involving multiple conveyors and sliding trays, would be difficult and costly to control and maintain in practice. The combination of numerous different moving parts and the likelihood of contamination and frequent spillage from the open food trays while they are on the vertical or horizontal conveyors or while sliding from the cabinet to the horizontal conveyor virtually guarantees unsanitary and unsightly operating conditions and frequent down times for cleaning. Indeed, even in the absence of any spillage, the open food storage trays of Bardy et al. represent unacceptable sanitary conditions under modern health codes. Moreover, after "dumping", each food tray must be recovered, cleaned, refilled, and reloaded on one of the vertical conveyors, a costly and labor-intensive procedure. Reusing the food trays of Bardy et al. without cleaning them would compromise sanitary conditions because the trays are removed from the protection of the cabinet and exposed to various environmental contaminants while moving from the cabinet to the tray dumping position.

U.S. Pat. No. 2,497,219 (Haumann) describes a coinoperated vending machine "adapted to vend frozen articles such as ice cream bars and the like," (col. 1, lines 1-4). The apparatus comprises a freezer compartment and a continuous vertical conveyor having a plurality of receiving pockets for storing the ice cream bars (FIG. 5). The apparatus also includes an ejection/dispensing system whereby an ejection arm pushes each ice cream bar out of its receiving pocket and over the upper edge of an inclined discharge passage (FIGS. 6, 7 and 11).

The ice cream bar slides down the discharge passage (numeral 73 in FIG. 11), out through door 74, and into discharge tray 77.

U.S. Pat. No. 3,685,432 (Hoeberigs) is directed to a coin-operated automatic vending machine for cooked or fried foods such as french-fried potatoes. The Hoeberigs apparatus comprises a cooled food storage compartment housing a continuous vertical conveyor that carries a series of 4-compartment food holders (FIGS. 1 and 2). The food holders are designed to freely hang so as to be rotatable about a horizontal axis so as to be capable of a tipping movement (FIG. 4) which results in emptying the contents of a holder into a 4-compartment funnel (FIG. 1, reference numeral 35) and thence along a guide surface (reference numerals 52 and 53) which directs the respective food products into a frying basket (reference numeral 54). An earlier version of this invention is shown in U.S. Pat. No. 3,398,672 (Hoeberigs) wherein food containers carried on a continuous vertical conveyor can be tipped so as to pour the food product into a ladle by action of gravity. The pivotally-mounted ladle then descends into a cooking cauldron.

U.S. Pat. Nos. 2,804,982 (Verrinder); 3,779,410 (Phillips et al.); 3,315,785 (Shiffer); and 4,979,864 (Cahlander et al.) show the general concept of tipping or inverting a box or container in order to empty the contents thereof by action of gravity. For example, Phillips et al. is directed to a machine for automatically unloading chewing gum base materials from cooling pans as the pans move along a horizontal conveyor. A filled pan is propelled out of the conveyor where it is inverted, lifted and vibrated to separate the gum base from the pan.

None of the aforementioned prior art patents, however, teaches a system intended for or capable of use as an automated frozen food storage and dispensing system consistent with modern sanitation requirements, efficiency and flexibility of operation and labor-saving needs, and compatible with computer-controlled automated frying systems (such as the one described in pending parent application, U.S. patent application Ser. No. 07/759,606, filed in the names of Richard N. Caron, David H. McFadden, John M. Collins, and John Dieckman, which application is a continuation of U.S. patent application Ser. No. 07/458,982, filed in the names of the same inventors and now abandoned), both applications being described hereinafter as the "Prior Applications". More particularly, none of the aforementioned prior art patents teaches an automated frozen food dispenser which, when operated as part of an automated, integrated frying system, can quickly and easily respond, with a minimum of manual labor, to the normal ebb and flow of business during the course of a day at a modern fast food restaurant. These and other problems with and limitations of the prior art are overcome with the frozen food dispensing freezer of this invention.

OBJECTS OF THE INVENTION

Accordingly, it is a general object of this invention to overcome or substantially reduce the above-noted problems with and limitations of the prior art.

Specifically, it is an object of this invention to provide a method of and apparatus for storing and automatically dispensing portions of a frozen food product in conjunction with the operation of an automated deep fat fryer system.

Another object of the present invention is to provide a method of and apparatus for storing and automatically dispensing portions of a frozen food product that meet modern health and sanitation requirements.

A further object of the present invention is to provide a method of and apparatus for storing and automatically dispensing as needed preselected portions of any one of a plurality of different frozen food products.

Still another object of the present invention is to provide an automatic frozen food dispensing freezer having a minimum of moving parts with easily accessible interior regions and operating mechanisms for ease of reloading the food compartments and for cleaning the apparatus.

Another object of the present invention is to minimize or at least substantially reduce the labor costs associated with deep fat cooking operations, especially in a fast-food restaurant.

Still a further object of the present invention is to provide a higher quality fried food product by means of superior storage, dispensing and handling of the food product as described herein.

Yet another object of the present invention is to provide an automated frozen food dispenser which, when utilized as part of an automated, integrated frying system, is capable of operating based on point of sales information and daily business cycles.

Other objects of the invention will in part be obvious and will in part appear hereinafter. The invention accordingly comprises the processes involving the several steps and the relation and order of one or more of such steps with respect to each of the others, and the apparatus possessing the construction, combination of elements, and arrangement of parts exemplified in the following detailed disclosure, and the scope of the application of which will be indicated in the claims.

SUMMARY OF THE INVENTION

The frozen food storage and dispensing system of the preferred embodiment of this invention broadly comprises food product boxes or containers filled with the same or different frozen food product(s). Each container contains one or a plurality of compartments, each compartment having a hinged cover which remains closed so as to virtually seal the compartment until the food is dispensed so as to prevent contamination. The containers are supported by a continuous carrousel assembly or conveyor to hold and move the containers inside a freezer unit. As a particular filled container passes over the top of the conveyor, the container is inverted and moves into a dispensing location. A dispensing mechanism positioned at the dispensing location moves the container containing a predetermined amount of a desired food product relative to the carousel assembly so as to successively and selectively index each compartment of the container over a transport or discharge chute. As each compartment of a container is moved to a dispensing position at the dispensing location, the hinged cover of the compartment opens thereby permitting the frozen food product inside that compartment to fall by gravity feed through the chute which conveys the product to a waiting fryer basket for cooking. In a similar fashion, additional compartments of the same food product container can be indexed over the chute and thereby successively emptied into corresponding fryer baskets. When all compartments of the food product container have thus been emptied, the empty container is retracted back onto the carousel assembly permitting a new filled container to be positioned at the dispensing location. Alternatively, the compartments of different containers can be successively used to dispense different products in a predetermined sequence depending on demand. A control which maintains an inventory of the products remaining in the containers within the system can be used to locate and dispense a particular product where several products are stored and dispensed from the system. The apparatus has the advantages of permitting loading or filling of containers at waist-height, dispensing from an elevated height to facilitate a gravity feed, and permitting extended storage of frozen foods in the freezer compartment, with minimum exposure.

BRIEF DESCRIPTION OF THE DRAWINGS

For a fuller understanding of the nature and objects of the present invention, reference should be had to the following detailed description taken in connection with the accompanying drawings wherein:

FIG. 5 shows a longitudinal cross-sectional view through the support shelf with the container disposed in a retracted position so that it can be easily indexed through the loading and dispensing locations by the carrousel assembly;

FIG. 6 shows a longitudinal cross-sectional view through the support shelf with the container disposed at an intermediate position so that several trap doors have opened and the respective compartments emptied;

FIG. 7 shows a longitudinal cross-sectional view, in a direction normal to the view shown in FIGS. 5 and 6, through the support shelf;

DETAILED DESCRIPTION OF THE DRAWINGS

Figure 1:
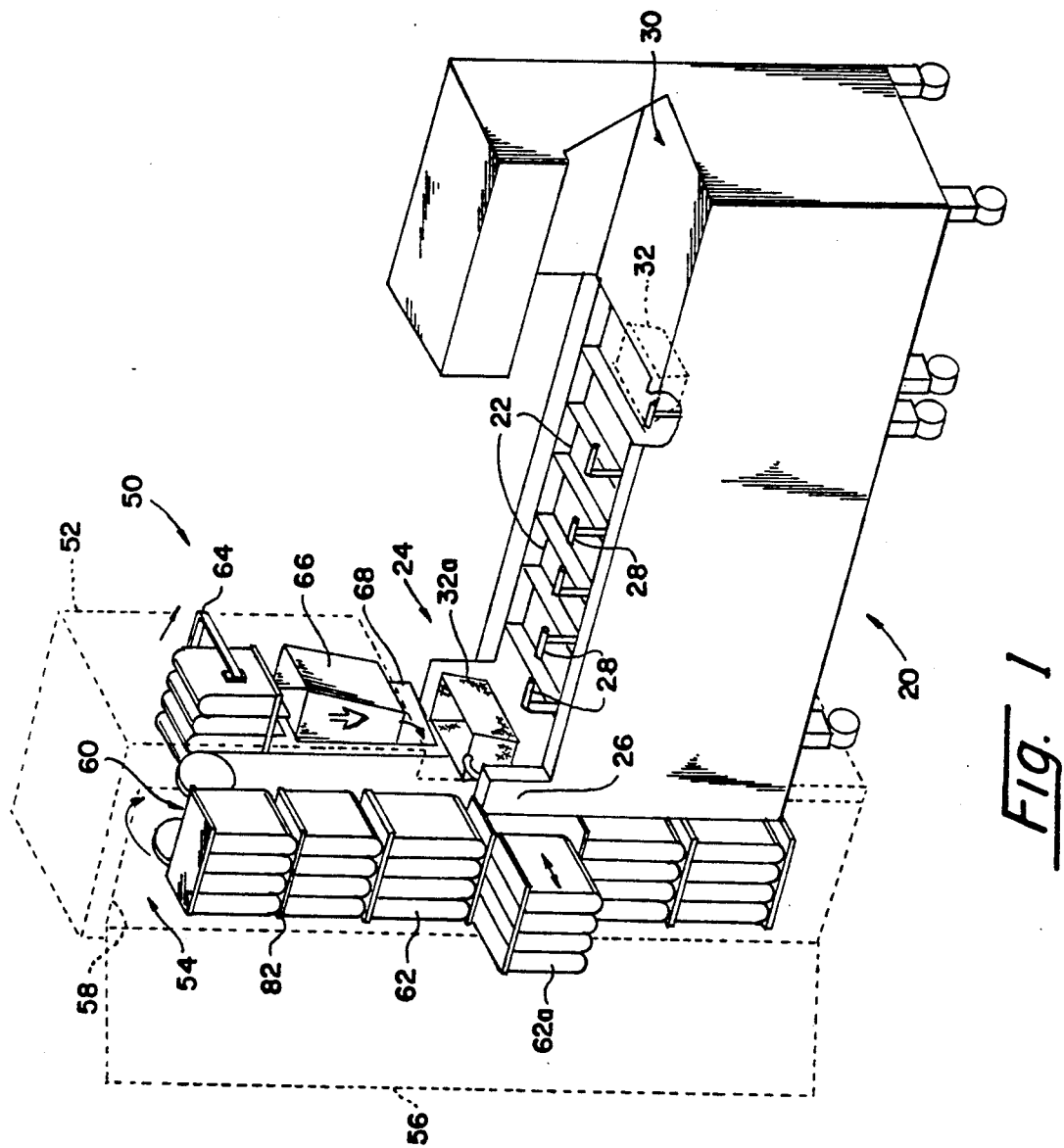
FIG. 1 is a perspective view, partially cut away, of the frozen food storage and dispensing freezer of the present invention shown in combination with an automated deep fat fryer.

In the drawings the same numerals are used to designate the same or similar parts.

Referring to FIG. 1, the frozen food storage and dispensing freezer system of the present invention, generally indicated at 50, is shown in combination with an automated deep fat fryer system 20, of the type shown and described in the Prior Applications. In general, the system 20 includes a plurality of independent fryer stations or frypots 22 for containing hot oil for deep fry cooking of food in predetermined amounts as described in the Prior Applications. The fryer system 20 also includes a loading station indicated generally at 24, a horizontal transport assembly generally indicated at 26, a plurality of vertical transport assemblies 28, and a receiving station 30. In general, the fryer system 20 operates automatically by moving any one of several frying baskets 32 with the horizontal transport assembly among (a) a loading station 24, where a predetermined amount of food can be dispensed from the storage and freezer system 50 into a basket shown at 32a in a manner to be described in greater detail hereinafter, (b) a transfer position for each of the vertical transport assemblies 28 so that a basket can be transferred between the horizontal transport and each of the vertical transports and (c) a receiving station 30 where cooked food product can be unloaded from a basket after its contents have been cooked in one of the frying stations 22. Each vertical transport assembly 28 is adapted to receive a basket held by the horizontal assembly 26 at the corresponding transfer position of that vertical transport, and lower the basket into the oil of the respective frypot 22 where the cooking is controlled by the computerized system forming a part of the frypot which is a commercially available unit. After cooking, each vertical transport assembly 28 is adapted to first lift the basket from the hot oil where the excess oil is allowed to drip down into the frypot, and then lift the basket up to the transfer position so that the basket and its load can be transferred back to the horizontal transport assembly. The basket is then moved by the horizontal transport assembly 26 to the receiving station 30. As will be apparent hereinafter a proximity sensor 34 (see FIG. 9) is provided for sensing when a basket 32a is properly positioned within the loading station 24. The specific details of the frying system are described in greater detail in the Prior Applications, which details are incorporated herein by reference.

The frozen food storage and dispensing freezer system 50 includes a refrigeration housing, shown in phantom at 52 and suitably made with sufficient thermal insulation 55 (seen in FIG. 9) so as to preserve a presettable cold temperature within the freezer space 54 defined by the housing. The housing 52 is provided with a front door 56 cooperative with the door opening 58.

When door 56 is closed the freezer space 54 is suitably sealed around the door opening in a well known manner. The door opening 58 is large enough to receive a carrousel assembly 60 for supporting a plurality of multicompartment containers 62. A dispensing mechanism 64 is mounted on the internal back wall in the freezer space for selectively dispensing food product from each compartment of each container as described in greater detail hereinafter. The freezer housing is provided with a side section above the loading station 24, the side section containing a discharge chute 66 (seen in FIG. 1 and in phantom in FIG. 9). A door 68 is provided at the bottom of the chute 66 and, in a preferred embodiment of the invention, is adapted to open just prior to the dispensing of product into basket 32a below, and to close immediately thereafter in order to minimize the exposure of the interior freezer space to warm moist air as well as grease and fumes from the frypots 22. Preferably, the linkage for opening and closing the door 68 allows the door to open and close very quickly. In the preferred embodiment, the linkage is a "scotch yoke" assembly although other arrangements will be obvious to those skilled in the art. The opening and closing of the door 68 can be controlled, for example, by a reversible motor drive 70 shown in FIG. 9.

Figure 2:
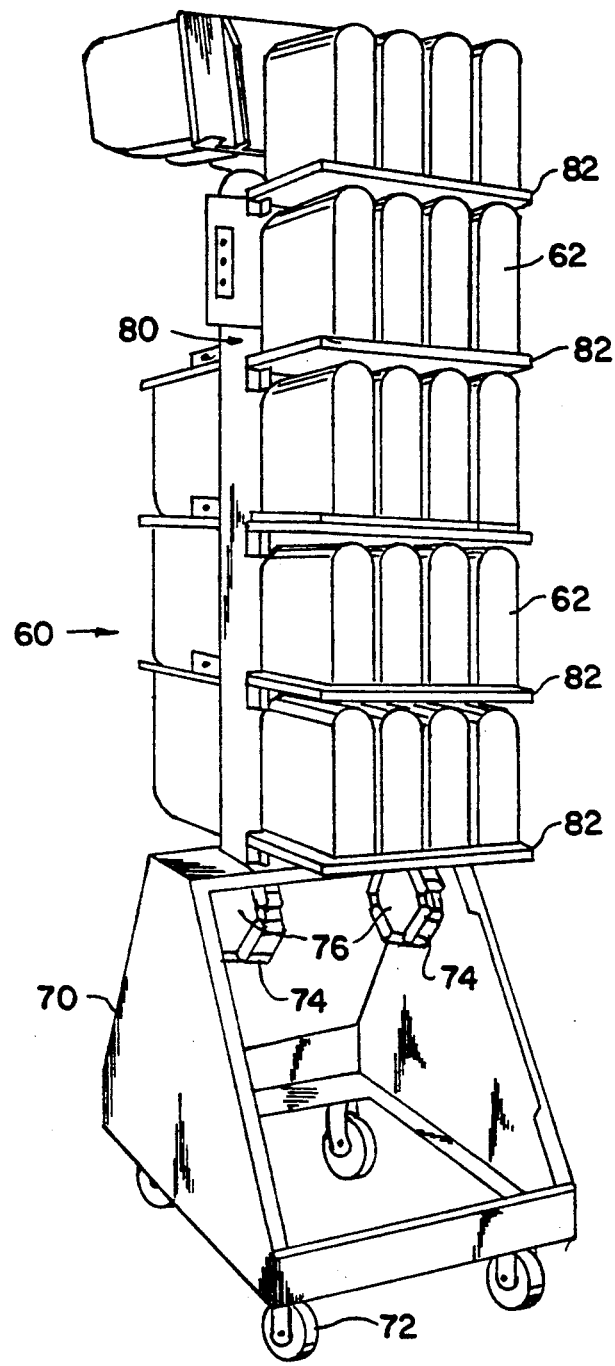
FIG. 2 is a perspective view, of the preferred embodiment of the carrousel assembly of the storage and dispensing system of the freezer.

The carrousel or conveyor assembly 60, shown in full rear view in FIG. 2, includes a base 70 suitably supported on wheels 72 so that the carrousel assembly can be easily rolled into and out of the freezer space 54. The carrousel assembly 60 includes suitable means (not shown) for correctly positioning and locking the carrousel assembly in the freezer space relative to the dispensing mechanism 54.

Figure 9:
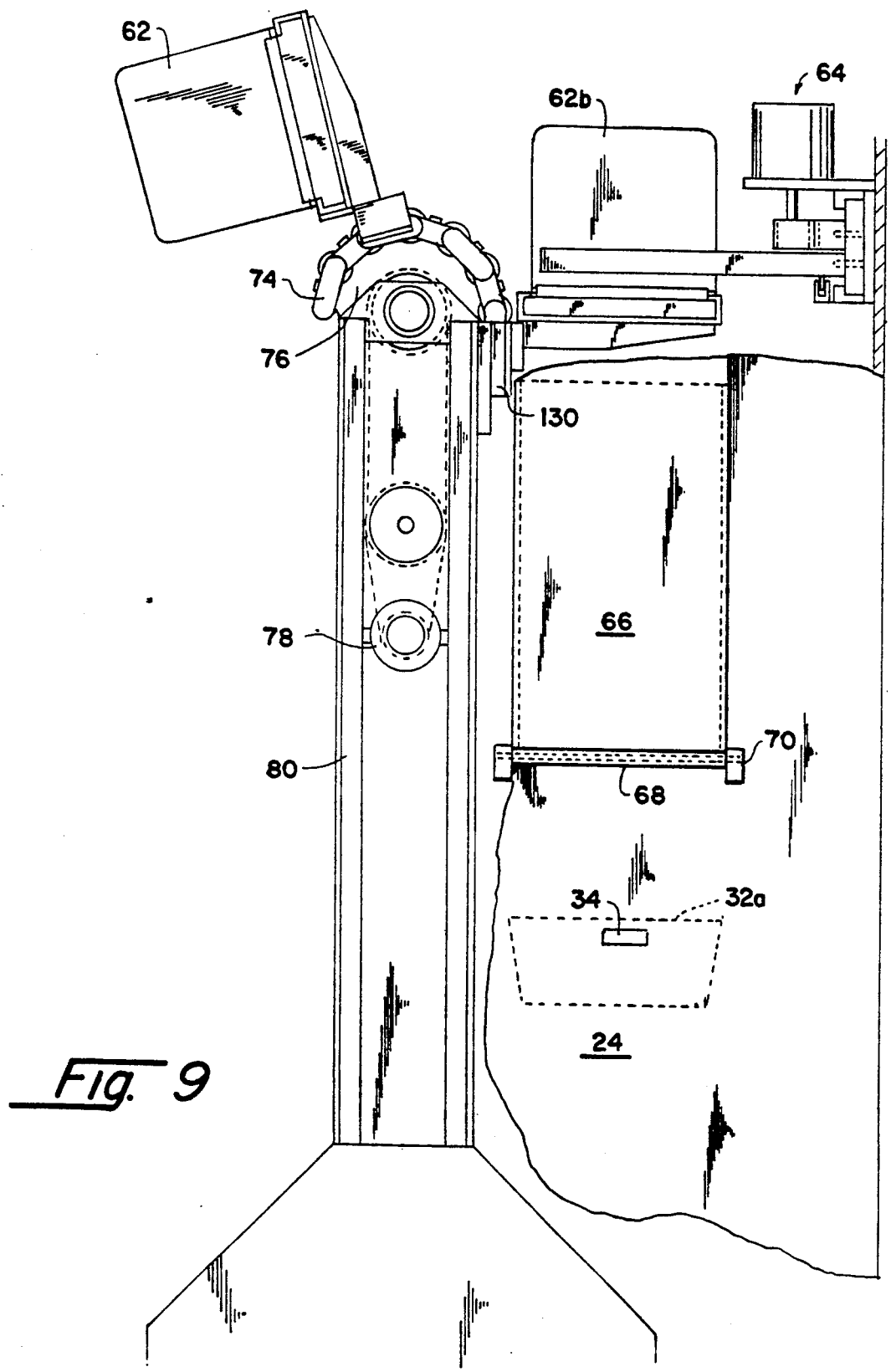
FIG. 9 shows a side view of the carrousel assembly, with portions omitted, showing a container in the dispensing location disposed within the dispensing mechanism, with the dispensing chute and trap door through which food product is dispensed being shown in phantom and a basket positioned at the loading station shown in the foreground.

The carrousel assembly 60 includes a pair of chain drives 74 adapted to move on gears 76 (the bottom gears being shown in FIG. 2 while one of the upper gears is generally indicated in FIG. 9) and is driven by a motor (shown generally at 78 in FIG. 9). The chain drives 74, gears 76 and motor 78 are all supported on a pair of parallel support assemblies 80 extending vertically from the base 70. A plurality of support shelves 82 for respectively supporting the containers 62 are mounted on the chain drives 74 so that the shelves remain generally equally spaced along the chains and substantially in planes parallel to one another. The motor 78 is preferably a motor for driving the chain at a constant speed and so that the chain drives 74 and supported containers 62 can be indexed through the dispensing location and precisely stopped when the desired container is positioned in the dispensing location within the dispensing mechanism 64, as described in greater detail hereinafter. The carrousel assembly is thus adapted to move each container 62 in a circuitous path from a waist-high loading location where each container 62 can be easily filled with food product and mounted in an upright orientation onto a support shelf 82, as indicated by the container 62a in FIG. 1, moved up the front side (as seen in FIG. 1) of the carrousel assembly and over the top (as best seen in FIG. 9) where the container inverts as it moves into the dispensing location, as indicated by the container 62b in FIG. 9 near the top of the carrousel assembly. The container then can be moved from the dispensing location down the back side of the carrousel assembly through the base 70 and around the bottom of the chain drives to the front of the carrousel assembly so as to right the orientation of each container so that each container is in an upright orientation when it reaches the loading location. It should be appreciated that while the direction of movement of the containers in the carrousel assembly is described in one direction, the containers can be moved in the opposite direction. Thus, in an alternative arrangement, the carrousel assembly can be adapted and operated so that container 62a in FIG. 1 is moved down the front side of the carrousel assembly, around the bottom of the chain drives to the back side of the carrousel assembly, and thence up the back side in the inverted position to the dispensing location. From the dispensing location, the container can then be moved over the top of the chain drives and down the front side of the carrousel assembly to return the container to the loading location. In still another arrangement the carrousel assembly can be adapted and selectively operated in both directions so that the food containers can be moved into the dispensing location from either above or below.

Figure 3:
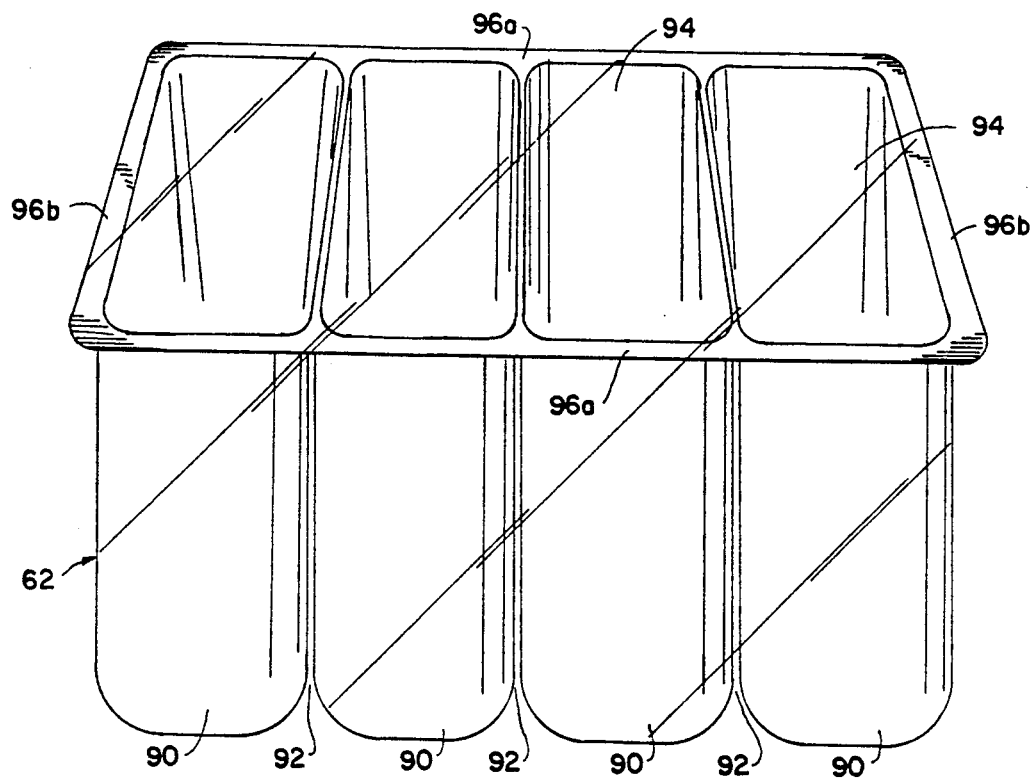
FIG. 3 is a perspective view of the preferred multicompartment container used to store predetermined amounts of frozen food in the storage and dispensing system of the present invention.

Referring to FIG. 3, the preferred container is shown in perspective. Each container is preferably identical in size and construction and is preferably made of a hard, scratch resistant plastic, such as an acrylic, capable of withstanding repetitive temperature cycling due to the fact that each container is continually taken out of and put back into the freezer every time the containers need to be reloaded with food product. Alternatively, each container can be made of an inexpensive disposable material, such as polyethylene terephthalate so that food products can be prepackaged and used in carrousel assembly and the packaging thrown away after use. Each container 62 includes at least one and preferably includes a plurality of separate compartments 90. Each compartment is sized to contain a predetermined amount of food product which is considered optimum for frying in a basket 32 in a frypot 22. For example, french fried potatoes are preferably cooked in batches of one and one-half pounds for best results. The compartments are actually formed with spaces therebetween so as to form a slot 92 between adjacent compartments. Each compartment is completely closed except for one open end 94. All of the open ends 94 of a container are disposed within a common plane defining the top of the container as seen in FIG. 3, when the container is in its upright position. Each container 62 is provided with back and front lips 96a and side lips 96b around the circumference of the top of the container so that the container can be slidably mounted on any one of the shelves 82, as described below.

Figure 4:
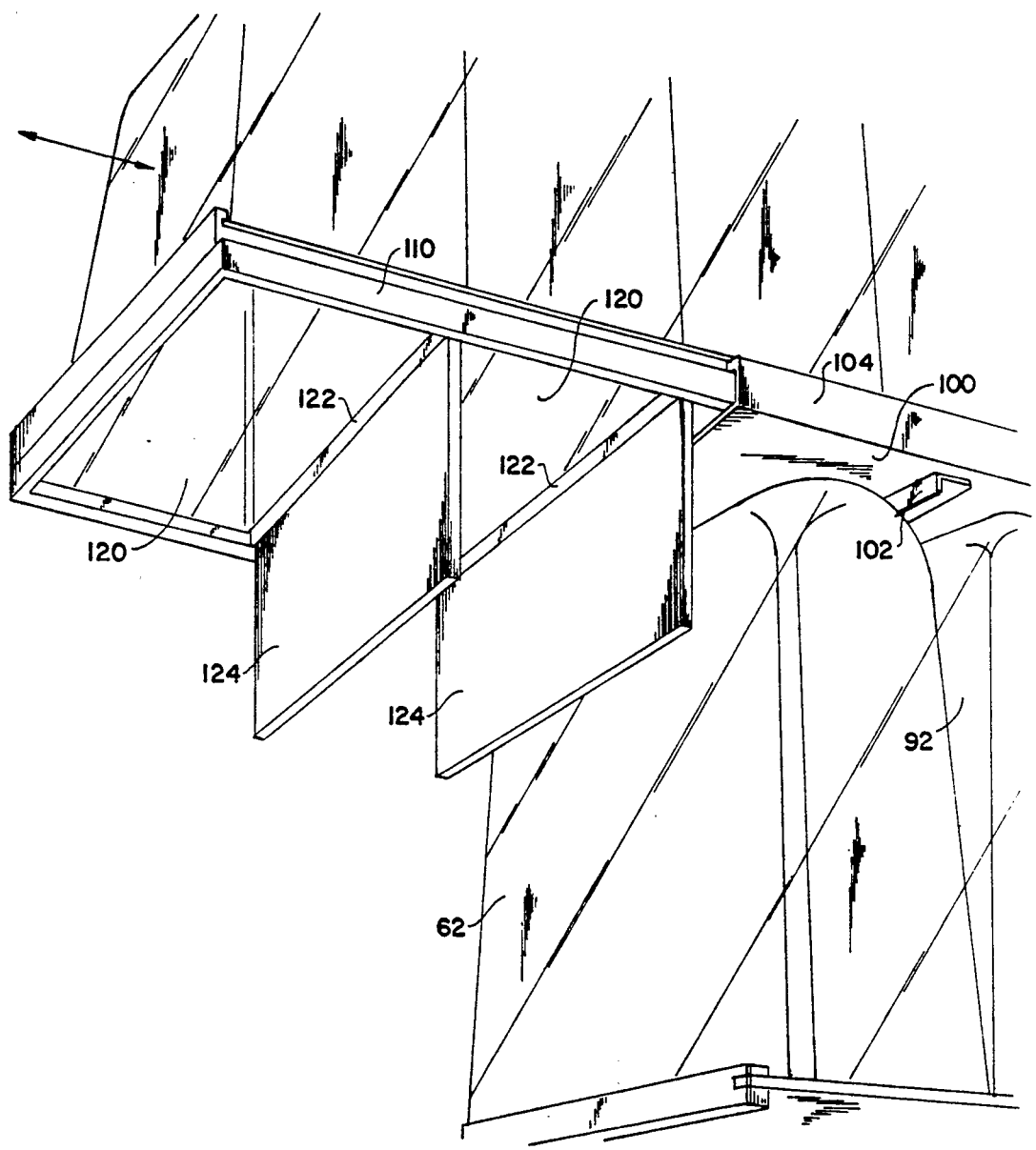
FIG. 4 is a perspective view looking upwardly at the multi-compartment container positioned on a support shelf of the carrousel assembly and moved to an intermediate position so as to show two opened trap doors and the respective empty compartments of the container.

Each support shelf 82 includes a two track assembly so that the containers can be mounted onto a shelf by sliding a container from the front of the freezer space toward the back of the freezer space as best seen in FIG. 1, while the container, once mounted on a support shelf can be laterally moved in the dispensing location from the left side of the freezer (as seen in FIG. 1) to a position just above the discharge chute 66. Referring to FIG. 4–7, each support shelf 82 includes a support plate 100 supported by a pair of support gussets 102 suitably attached to the bottom surface of the plate as seen in FIG. 7. The gussets 102 are positioned so that they will be disposed in the slots 92 (as seen in FIGS. 3 and 4) of the adjacent container supported by the shelf below (as seen in FIG. 7) so as to laterally lock each container in its retracted position when it is not in the dispensing location. In addition, for reasons which will appear hereinafter, the support plate 100 is provided with a rear flange 108 proximal the carrousel assembly, extending below the plane of the plate as seen in FIG. 5, the rear flange being provided with locking tab 106 extending from the side of the flange. The opposite sides of the support plate 100 are provided with a pair of parallel guide rails 104 extending up from and preferably integrally formed with the plate 100 as best seen in FIG. 7. These guide rails are oriented parallel to the direction of lateral movement of the supported container when the latter is moved at the dispensing location.

A support frame 110 is adapted to be supported and slide in the guide rails 104 along the top surface (as seen in FIG. 7) of plate 100. The support frame, shown in detail in FIGS. 4-7, is essentially a flat rectangular frame so as to easily slide in the guide rails 104, and includes a second pair of parallel guide rails 114 extending up (as seen in FIGS. 4-7) from and preferably formed as a part of the frame. The spacing between the second pair of guide rails 112 is such that parallel side lips 96b of any one of the containers 90 can be supported by and slide in the second set of guide rails. The guide rails 112 are oriented in a direction perpendicular to the direction of the guide rails 104 and are open at their ends remote from the support assemblies 80 of the carrousel assembly 60 so that each container can be easily mounted onto the support shelf by threading the lips 96b into the guide rails 112 and pushing the container back towards the carrousel assembly into its position as seen in FIG. 1. It should be appreciated that when mounting the container onto the support shelf, the container is upright and the support frame 110 and the second set of guide rails 112 will be provided below the support plate 100. Suitable locking means, as for example a spring loaded locking pin assembly 112 shown in FIGS. 5 and 6, can be used to lock the container to the respective support frame 110.

Figure 8:
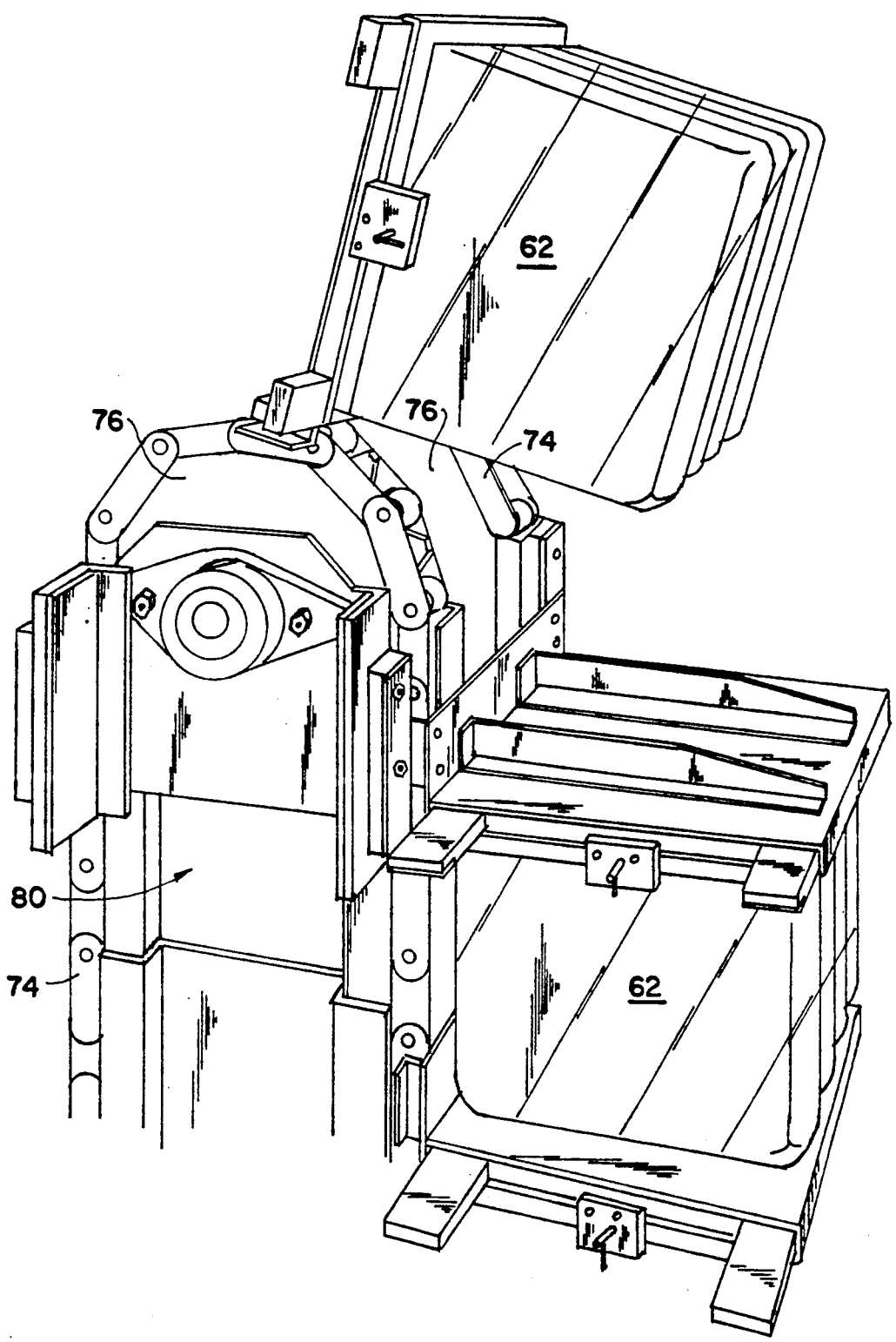
FIG. 8 shows a partial side perspective view of the carrousel assembly with a container moving into the dispensing location.

The frame 110 includes a plurality of openings 120 separated by spacing bars 122 adapted to respectively coincide with the openings 94 and spacings therebetween of a container 62 properly secured in the frame. A plurality of trap doors 124 (as seen in FIGS. 4-6) are supported on respective hinges by the frame for the respective openings 120. The doors are hinged so that when the container, supported in the frame 110, is inverted, and moved in the guide rails 104 by the dispensing mechanism from a totally retracted position wherein all of the trap doors are forced closed by the support plate 100 (as best shown in FIG. 5) toward an extended position (as suggested by FIG. 6), each door will pass the side edge 126 of the support plate 100 and fall open due to gravity. Similarly, as the container is moved back to its retracted position each door will interact with the edge 126 and will pivot closed. The frame 104 further includes a U-shaped extension 128 (seen in FIGS. 5, 8 and 10), the front and back edges of which remain in the guide rails 110 when the supported container is moved to the fully extended position resulting in the container being cantilevered over the discharge chute 66 when in this position. The center portion of the extension 128 is open to allow each container in its retracted position and supported on a respective support shelf 82 to move easily through the dispensing mechanism 64, as will be more evident hereinafter.

After being secured on the respective support shelves at the loading location, the containers will move in sequence through the dispensing location where the individual compartments 90 can be sequentially emptied. In order to stabilize the container and insure that it is precisely positioned in the dispensing location, a guide block 130 (seen in FIGS. 9 and 14) is provided on the side of the support assembly so as to receive the locking tab 106 of each support plate 100 as the support plate 100 moves into the dispensing location. As will be evident hereinafter, a proximity sensor 190 (seen in FIG. 14) can be provided for sensing when a container is properly positioned in the dispensing location.

The dispensing mechanism 64 is supported on the rear wall of the freezer space 54 and is adapted to move a container 62b properly disposed in the dispensing location among (a) a retracted position where the container is positioned on the respective support shelf 82 so that all of the trap doors 124 of the container are closed over the openings 120 adjacent the support plate 100 so as to seal each compartment, as shown in FIG. 5, (b) successive intermediate positions where the support frame 110 moves in the guide rails 104 so that the trap doors 124 are moved beyond the edge 126 and successively fall open (three being shown open in FIG. 6), wherein the contents of the corresponding compartments 90 of the container are successively emptied by falling through the openings 94 and 120 and into the discharge chute 66, and (c) a fully extended position where the frame 110 moves in the guide rails 104 so that all of the doors 124 are moved beyond the edge 126 and are thus opened and the contents of the corresponding compartments emptied into the dispensing chute 66.

Figure 10:
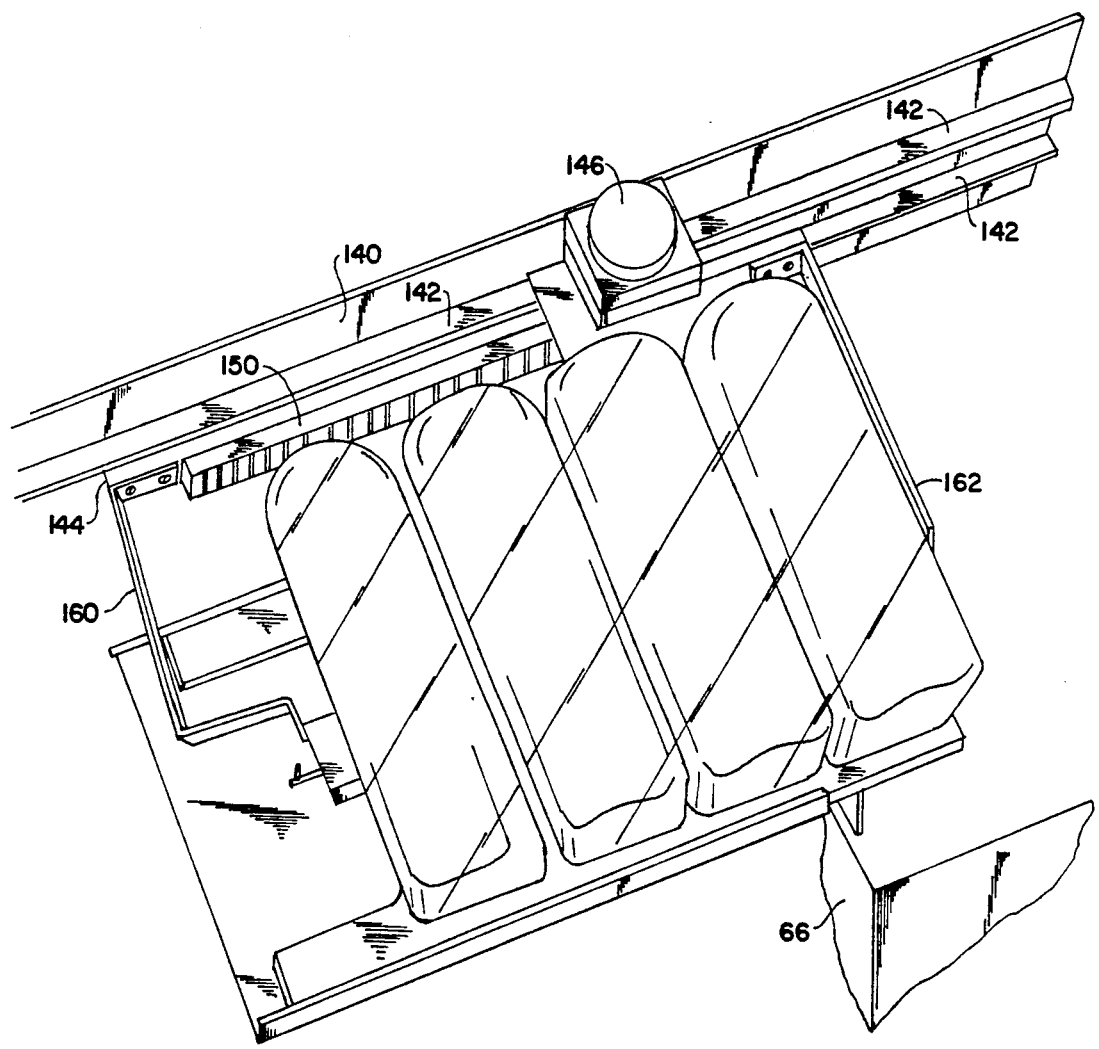
FIG. 10 shows a top perspective view of the container position, partially cut away, with a container positioned within the dispensing mechanism.
Figure 11:
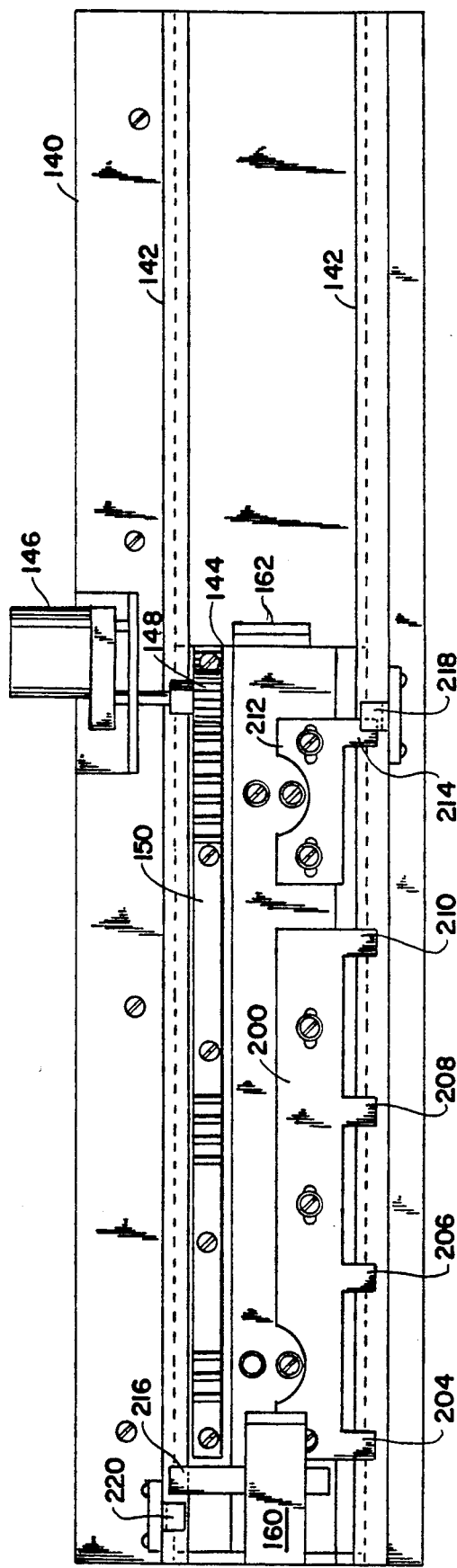
FIG. 11 shows a side view of the preferred embodiment of the dispensing mechanism.

More specifically, the dispensing mechanism 64 is shown in greater detail in FIGS. 10 and 11. The dispensing mechanism includes a guide rail 140 secured to the back wall of the freezer space 54. The guide rail 140 includes a pair of parallel ways 142 disposed parallel to the ground. A reversible motor 146 connected to drive a pinion gear 148 is mounted on the guide rail 140. A block 144 is secured within and adapted to slide relative to the ways 142. A rack gear 150 is secured to the block 144 and interacts with the pinion gear 148 so that energization of the motor 146 in one direction moves the block in the guide ways 142 in one lateral direction, and energization of the motor in the opposite direction moves the block in the opposite lateral direction.

An extension arm 160, for pushing a container in the dispensing location from the retracted position through the intermediate positions to the fully extended position, is secured to one end of the block 144 so that it will come into contact with the side of the container remote from the discharge chute 66 when the block is moved in the direction toward the chute. Similarly, a retraction arm 162, for pushing the container in the dispensing location from a partially or fully extended position through the intermediate positions to the retracted position is provided on the opposite end of the block 144 so that it will come into contact with the side of the container proximate to the chute when the block is moved in a direction away from the chute. Arms 160 and 162 are formed and spaced relative to one another so that when the block 144 is in the home position, each container 62 and its respective support shelf 82 can easily move between the arms into and out of the dispensing location with the operation of the carrousel assembly 60.

Figure 12:
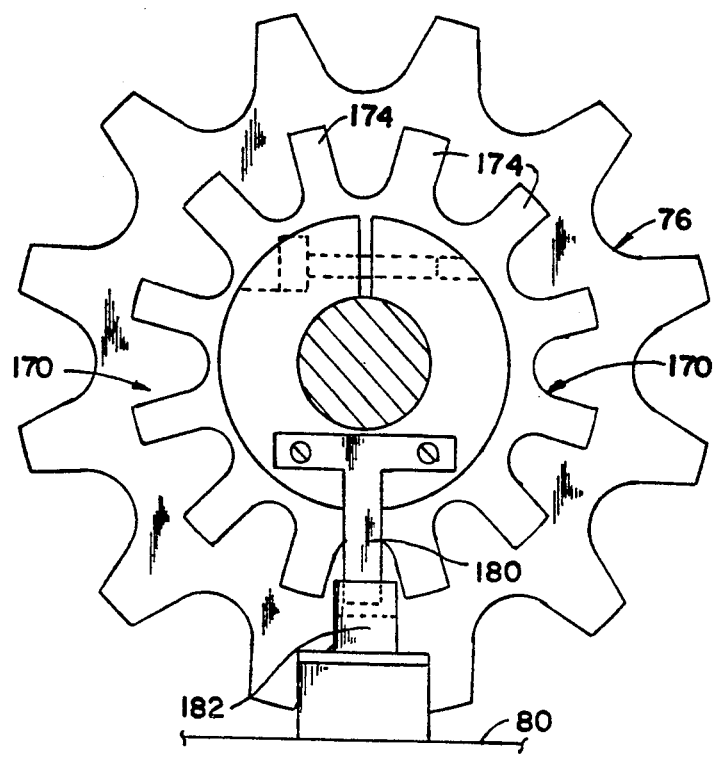
FIG. 12 shows a side view of the sensing portion of the indexing system for identifying the container that is disposed in the dispensing location.
Figure 13:
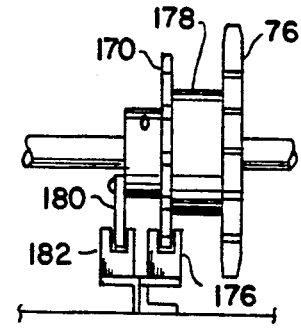
FIG. 13 shows a side view of the sensing portion of the indexing system shown in FIG. 12.

An indexing and control system is provided in order to (1) determine which container 62 is positioned in the dispensing location, and which of the compartments have been emptied, (2) maintain an inventory account of what remaining food product is contained in which compartments of which containers, and (3) control the system so that the appropriate container with a select product can be moved to the dispensing location upon demand and a compartment of food product dispensed through the discharge chute 66 to an awaiting basket 32a at the loading station 24. More specifically, referring to FIGS. 9, 12 and 13, the indexing and control system includes a container sensing mechanism 170 for determining which container 62 is positioned in the dispensing location. In FIGS. 12 and 13, mechanism 170 includes a sprocket wheel 172 having tabs 174, one for each of the containers, disposed equiangularly around the axis of the wheel. A proximity sensor 176 is secured to the support assembly 80 for sensing the proximity of a tab 174 when a tab is position at the sensor location. The wheel 172 is rotatably mounted on the support assembly 80 of the carrousel assembly 60 and is coupled through a gear reduction mechanism 178 to the upper gear 76 so that as each successive container is correctly position at the dispensing location, a corresponding successive tab comes into close enough proximity to the sensor 176 so as to be detected. In addition, a reference tab 180 is secured to and rotates with the wheel 172 for defining a home position for the containers in the carrousel assembly, i.e., arbitrarily defining the ordering of the successive containers. Thus, as each container moves into the dispensing location a tab 174 moves into the proximity of the sensor 176 and can be uniquely identified and distinguished from the other containers.

Figure 14:
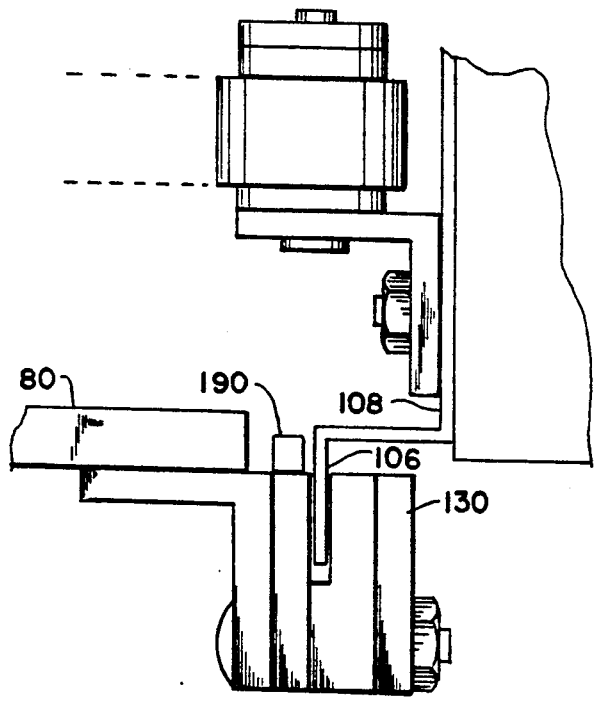
FIG. 14 shows a guide system for insuring the proper alignment of the container as it moves into and is positioned at the dispensing location.

In addition, a proximity sensor 190 is mounted on the guide block 130 so as to sense the proximity of tab 108, as seen in FIG. 14, so as to detect when a container is correctly positioned within the dispensing location.

In order to sense the position of the container in the dispensing location with respect to the retracted, intermediate and extended lateral positions, as shown in FIG. 11, means, in form of a plate 200, defines four tabs 204, 206, 208 and 210 for sensing the four intermediate positions where the respective traps doors 124 are opened. In addition, a plate 212 includes a first home tab 214 for sensing the home position when the retraction arm 162 moves the container to the retracted position (and the extension arm 160 is spaced from the container). A proximity sensor 218 senses each of the tabs 204, 206, 208, 210 and 214 as each tab is moved into proximity of the sensor. A separate plate defining a second home tab 216 is provided for sensing the home position when the extension arm moves into contact with the container, while the latter is in the retracted position at the dispensing location. A separate sensor 220 is provided for sensing the home tab 216 when the latter moves into proximity of that sensor. It should be appreciated that two separate home position tabs 214 and 216 are provided since the arms 160 and 162 are spaced apart by a larger distance than the width of each container and support.

The plates defining tabs 204, 206, 208 210 214 and 216 are all secured to and move with the block 144, while the sensors 218 and 220 are secured to the guide rail 140. When a container 62b is first positioned in the dispensing location, the motor 146 can be energized so as to move the block 144. As the block moves tab 214 into proximity of the sensor 218 the motor 146 is de-energized. This indicates that the extension arm 160 is now in contact with the container. When food product is to be dispensed from the first compartment, the motor is energized so that the block 144 moves until the tab 210 comes into proximity of the sensor 218. This will be at a position where the first trap door 124 will open and food product dispensed down the discharge chute 66. The process can be repeated for each successive compartment, wherein each successive tab 208, 206 and 204 moves into proximity with the sensor 218 as successive compartments are emptied. Once the last compartment has been emptied, the motor 146 is reversed, and the container returned to the retracted position wherein the block 144 is moved in a reversed direction until the tab 216 is sensed by the proximity detector 220. This will correspond to the container being in the totally retracted position, with the arm 160 spaced from the container so that the next container can be moved into the dispensing location.

It should be appreciated that with the proper control system the system can be informed of the contents of each compartment of each container so that the containers can contain one or more food products, such as french fries, chicken, etc. When it is desirable to cook a particular food product the appropriate container can be moved into the dispensing location. The only restriction would be that if compartments of the same container contain different food products, one could not dispense food product from one compartment where it would be necessary to have other compartments of the container, which contains different food product open first before reaching the appropriate compartment. Thus, if the first and second compartments to open contain french fries, and the third and fourth compartments contain chicken, it would be necessary to have already properly dispensed the french fries from compartments one and two, before one could reliably dispense chicken from compartments three and four. Subject to this restriction, the control system could operate so that not all of the compartments of a container need to be emptied before another container is moved into the dispensing location.

Figure 15:
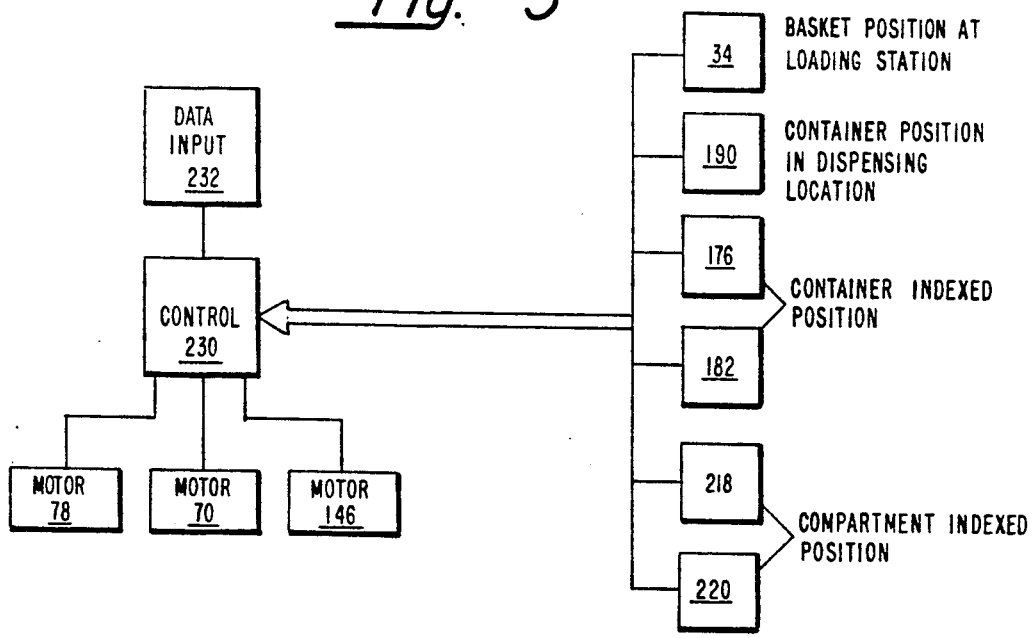
FIG. 15 is a block diagram of a control system for controlling and monitoring the positioning of each container and each compartment of each container with respect to the dispensing of one or more food products as well as maintaining an inventory of the remaining food products held by the containers and an indication of their respective locations by compartment and container.

Thus, referring to FIG. 15, a master control 230 (which can be a part of the control system for controlling the fryer system 20 as described in the Prior Applications) is provided for controlling the storage and dispensing of food product. The control 230 can be provided data from data input 232, which can be a keyboard, or like device. The control 230 is suitably connected to receive signals from the sensors 34, 176, 182, 190, 218 and 220, and to provide the proper energization signals to motors 70, 78 and 146. With respect to the motors 70 and 146, since each of the latter can be operated in one of two directions to respectively open and close the door 68 and move a container to and from the home position, when the control 230 energizes each of these motors it also indicates the direction of energization.

In operation, as seen in FIG. 1, the operator of the system fills each compartment of each container 62 with a predetermined amount of the appropriate food product and loads the container in an upright orientation onto a support shelf 82 at the loading location. The carrousel assembly 60 can remain in the freezer space and the containers loaded with the door 56 open. Alternatively, the carrousel assembly can be removed from the freezer space and the loaded with the filled containers. The specific position of each container on the carrousel assembly and the contents of each compartment is entered through the data input 232 into the control 230. Control 230 can be provided with suitable memory for storing the data. The control can also update the memory each time a compartment is emptied so that an inventory of what food product is contained in the remaining compartments of the containers, and where those containers are located at any one time relative to the dispensing location can be provided in the memory.

Once the containers are loaded, the door 56 is closed and automatic dispensing can commence.

When a basket full of a particular food product is desired, the demand can be created either by the operator placing an order through the data input 232, or automatically provided as a part of a histographic analysis of food demand at the particular establishment where the system is installed. With the demand made, the control 230 indicates which container is to be selected, and the motor 76 is energized if the container chosen is not already in the dispensing location. As the chosen container 64 arrives at the dispensing location as determined by the sensors 176 and 182, the corresponding guide tab 108 moves into the guide block 130 until the sensor 190 senses the proper positioning of the container. It should be appreciated that all of the containers, with the exception of the container in the dispensing location, will be locked in the retracted position and restrained from lateral movement because the gussets 102 of the adjoining support shelf 100 will be disposed in the corresponding bottom slots 92. As seen from FIG. 8, the container moves into the dispensing position after it is rotated about the top of the carrousel assembly so as to invert the container and so as to disengage it from the gussets of the adjacent support shelf 100. With the appropriate container in place, the first compartment full of food product is ready to be dispensed through the discharge chute 66. The system will not dispense food, however, until the sensor 34 indicates that the basket 32a is in its proper position at the loading station 24 below the door 68. Once control 230 receives an indication from sensor 34 and sensor 190 that the appropriate food product is ready to be dispensed, the motor 146 is operated in the direction so as to advance the container so that the next full compartment is emptied, by gravity, through the chute 66. The appropriate compartment is sensed by the sensor 218 as it counts the appropriate number of tabs 204, 206, 208 and 210 corresponding to the compartment of the container to be emptied. At the same time the motor 70 is operated to open the door 68 to allow the food product to fall from the chute to the waiting basket 32a. Once the compartment is emptied, the inventory in the memory of control 230 is updated, and operation can continue.

The apparatus and method of the present invention thus described provide a novel method of and apparatus for storing and automatically dispensing portions of a frozen food product in conjunction with the operation of an automated deep fat fryer system, and that meet modern health and sanitation requirements by keeping the containers completely closed until the food is dispensed. The method and apparatus also provide a novel way of storing and automatically dispensing as needed preselected portions of a plurality of different frozen food products. The freezer system has a minimum of moving parts, a majority of which can be made for example of stainless steel or suitable plastic material such as the plastic manufactured and sold under the trademark "Delrin", with easily accessible interior regions and operating mechanisms for ease of reloading the food compartments and for cleaning the apparatus. The present system thus minimizes or at least substantially reduces the labor costs associated with deep fat cooking operations, especially in a fast-food restaurant. The system helps to provide a higher quality fried food product by means of superior storage, dispensing and handling of the food product. By allowing data to be entered through the data input 232, the control is capable of operating with the automated, integrated frying system, based on point of sales information and daily business cycles.

Since certain changes may be made in the above process and apparatus without departing from the scope of the present invention herein involved, it is intended that all matter contained in the above description or shown in the accompanying drawings shall be interpreted in an illustrative and not in a limiting sense.

What is claimed is:

1. Apparatus for storing and dispensing preselected amounts of frozen food, said apparatus comprising, in combination:
    (A) freezer unit means comprising (i) a housing defining an interior freezer space, said housing having an opening for allowing for the passage of frozen food dispensed from said freezer means, and (ii) cooling means for maintaining said freezer space at a predetermined temperature below ambient conditions;
    (B) a plurality of food containers, each comprising at least one compartment for containing a preselected amount of said frozen food, said compartment having an open end;
    (C) continuous conveyor means for supporting said plurality of food containers and being positioned inside and adapted to move within said freezer space so that (i) at least at a first location said conveyor means supports each of said food containers in a substantially vertically upright position so that said open end is up, and (ii) at least at a second location said conveyor means supports each of said food containers in a substantially vertically inverted position so that said open end is down, said conveyor means including a plurality of support means for carrying respective ones of said containers at regularly spaced intervals so that each said container (a) extends outwardly substantially normal to the direction of movement of said conveyor means and (b) can be moved relative to the respective support means between (i) a first position wherein the open end of the compartment of the respective containers is covered so that said container can be moved on said conveyor means without food spillage or contamination, and (ii) a second position wherein the open end of the compartment of the respective container is uncovered so that food can be dispensed from said container when said compartment is inverted;
    (D) drive means for moving said conveyor means so that said containers can be selectively moved through a dispensing position; and
    (E) food dispensing means positioned at said second position so as to move a selective one of said container means in its inverted position between said first position and said second position so that food within said compartment can be dispensed through said opening.

2. Apparatus according to claim 1, wherein each of said plurality of support means for carrying respective ones of said containers includes support plate means for slidably supporting the respective container in relation to said open end so that said support plate means completely covers said open end of said compartment of the container when said container is in said first position, and said open end slides relative to said support plate means when said container is moved from said first position to said second position.

3. Apparatus according to claim 2, wherein said support plate means includes means for locking each respective container in locations other than said second location.

4. Apparatus according to claim 3, wherein each of said containers includes one or more slots formed in the end of said container opposite said open end of the compartment, and said means for locking includes gussets formed in each of said support plate means adapted to mate with said slots of an adjacent container when said container is in a location other than said second location so as to prevent said container from moving from said first position to said second position.

5. Apparatus according to claim 4, wherein conveyor means moves said containers so that said gussets disengage said slots of a container when said container moves into said second location.

6. Apparatus according to claim 2, wherein each of said support plate means includes a trap door adapted to cover the open end of said compartment when said container is in said first position, and open by gravity when said container is inverted and moved to said second location.

7. Apparatus according to claim 6, wherein said support plate means includes two sets of parallel tracks, one set for receiving and supporting said container on said conveyor means and the second set for allowing said container to move between said first and second positions.

8. Apparatus according to claim 7, wherein said first and second set of tracks are respectively disposed in parallel planes and said first set of tracks is oriented in a normal direction to the orientation of said second set of tracks.

9. Apparatus according to claim 1, further wherein each of said containers comprises a plurality of separate ones of said compartments, and said food dispensing means includes compartment indexing means for moving each said container relative to the respective support means among (a) said first position, (b) a plurality of intermediate positions wherein each successive open end of a corresponding compartment of the respective container is uncovered so that food can be dispensed from the corresponding compartment of said container when said container is inverted and (c) said second position wherein the open ends of all of the compartments of the respective container are uncovered.

10. Apparatus according to claim 9, further comprising means for determining when and which of said containers is at said second location and the position of said container.

11. Apparatus according to claim 10, wherein said means for determining when and which of said containers is at said second location includes container indexing means adapted to move with said conveyor means and correlated with said containers on said conveyor means and said compartment indexing means.

12. Apparatus according to claim 9, wherein each of said support plate means includes a plurality of trap doors, adapted to respectively cover the open ends of the respective compartments when said container is in said first position at said second location, and sequentially open by gravity when said container is moved through any one of said intermediate positions and said second position.

13. Apparatus according to claim 12, wherein said support plate means includes two sets of parallel tracks, one set for receiving and supporting said container on said conveyor means and the second set for allowing said container to move among said first, intermediate and second positions.

14. Apparatus according to claim 13, wherein said first and second set of tracks are respectively disposed in parallel planes and said first set of tracks is oriented in a normal direction to the orientation of said second set of tracks.

15. Apparatus according to claim wherein said freezer unit means includes door means adjacent said first location in said freezer space and large enough so that containers can be selectively removed from and mounted in said first location on said conveyor means.

16. Apparatus according to claim 15, further wherein said door means is dimensioned so as to be at least as large as said conveyor means, and said conveyor means comprises wheels to facilitate rolling said conveyor means into and out of said freezer space through said door means.

17. Apparatus according to claim 16, further wherein said conveyor means is positioned inside said freezer space so that the second location is adjacent the wall of said freezer space opposite said door means.

18. Apparatus according to claim 1, further comprising means for determining when and which of said containers is at said second location.

19. Apparatus according to claim 18, wherein said means for determining when and which of said containers is at said second location includes indexing means adapted to move with said conveyor means and correlated with said containers on said conveyor means.

20. Apparatus according to claim 1, further comprising receiving means in communication with said opening for receiving the food content of said compartment when dispensed from said compartment.

21. Apparatus according to claim 20, wherein said receiving means comprises a vertically-oriented dispensing chute.

22. Apparatus according to claim 1, wherein said drive means comprises gears and a chain drive.

23. Apparatus according to claim 1, further comprising means for controlling the rate at which said food product is dispensed from said apparatus.

24. Apparatus according to claim 1, further comprising means for selecting a container for positioning at said second location.

* * * * *

UNITED STATES PATENT AND TRADEMARK OFFICE
CERTIFICATE OF CORRECTION

PATENT NO. : 5,224,415

DATED : July 6, 1993

INVENTOR(S) : David H. McFadden, Richard N. Caron, John M. Collins, Robert Farra, Kevin P. Barnes, Joop F. Hoekstra, Thomas P. Hosmer It is certified that error appears in the above-identified patent and that said Letters Patent is hereby corrected as shown below:

Claim 15, column 16, line 20, after "claim" insert -- 1, --.

Signed and Sealed this

First Day of February, 1994

BRUCE LEHMAN

*Attest:*

*Attesting Officer*  *Commissioner of Patents and Trademarks*